United States Patent [19]

Wexler

[11] Patent Number: 5,397,826

[45] Date of Patent: Mar. 14, 1995

[54] COATING COMPOSITIONS FOR A TRANSPARENT MAGNETIC RECORDING LAYER

[75] Inventor: Ronald M. Wexler, Rochester, N.Y.

[73] Assignee: Eastman Kodak Company, Rochester, N.Y.

[21] Appl. No.: 173,833

[22] Filed: Dec. 22, 1993

[51] Int. Cl.$^6$ .................... C08K 5/07; C08K 3/22; C09D 5/23; B05D 5/12

[52] U.S. Cl. .................... 524/356; 524/361; 524/362; 524/363; 524/364; 524/431; 524/473; 525/375; 427/128; 428/328; 252/62.51

[58] Field of Search ............ 524/361, 362, 364, 431, 524/356, 463, 473; 525/327.2, 330.5, 375; 252/62.54, 62.51; 427/128, 132; 428/328

[56] References Cited

U.S. PATENT DOCUMENTS

| | | | |
|---|---|---|---|
| 3,862,860 | 1/1975 | Pardee et al. | 427/352 |
| 3,998,989 | 12/1976 | Pardee et al. | 428/409 |
| 4,279,945 | 7/1981 | Audran et al. | 427/130 |
| 4,363,850 | 12/1982 | Yasui et al. | 428/329 |
| 4,379,809 | 4/1983 | Matsufuji et al. | 428/470 |
| 4,443,514 | 4/1984 | Yamamoto et al. | 428/336 |
| 4,693,931 | 9/1987 | Andoh et al. | 428/328 |
| 4,923,945 | 5/1990 | Isozaki et al. | 524/361 |
| 4,952,444 | 8/1990 | Kawamata | 428/141 |
| 4,990,276 | 2/1991 | Bishop et al. | 252/62.54 |
| 5,064,687 | 11/1991 | Matsufuji et al. | 428/695 |
| 5,147,768 | 9/1992 | Sakakibara | 430/501 |

FOREIGN PATENT DOCUMENTS 0039165 11/1981 European Pat. Off. .
0102932 9/1978 Japan .

*Primary Examiner*—Tae H. Yoon
*Attorney, Agent, or Firm*—Robert A. Gerlach

[57] ABSTRACT

A coating composition for applying a transparent magnetic recording layer to a support which comprises a polymeric binder, ferromagnetic particles and a dispersing medium for the polymeric binder, the dispersing medium comprising (a) a compound having the formula

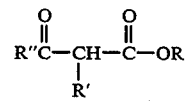

where
R is alkyl having 1 to 8 carbon atoms, phenyl or benzyl;
R' is hydrogen, methyl or ethyl; and
R" is alkyl having 1 to 5 carbon atoms; and
(b) methylene chloride, or lower alkyl ketones or mixtures of methylene chloride and lower alkyl ketones.

18 Claims, No Drawings

COATING COMPOSITIONS FOR A TRANSPARENT MAGNETIC RECORDING LAYER

FIELD OF INVENTION

This invention relates to coating compositions of dispersions of magnetic particles suitable for use in the preparation of photographic elements having a transparent magnetic recording layer with improved running durability, abrasion resistance, and scratch resistance. More particularly, it relates to dispersion of magnetic particles and non-magnetic inorganic particles for the stated purpose.

DESCRIPTION OF RELATED ART

Conventional magnetic recording elements that are used for recording sounds or images are generally opaque to visible light regardless of the nature of the magnetic particles used in such elements. For example, motion picture films often are provided with a magnetic sound track which generally is opaque and does not cover that portion of the film used in the projection of images.

U.S. Pat. No. 4,990,276 discloses a magnetic dispersion that can be used to cast a transparent magnetic recording layer in a cellulosic binder for use in photographic films. The vehicle employed in the application of the magnetic layer to the support is selected from methylene chloride, ketones, ethyl and butyl acetate, dimethylformamide, cyclohexanone, butyl alcohol and mixtures. The running durability, abrasion resistance, and scratch resistance of such layers requires improvement.

It is evident that it would be highly desirable to provide photographic elements having a transparent magnetic recording layer exhibiting improved magnetic and photographic performance, as well as improved running durability, abrasion resistance and scratch resistance. This goal is difficult to achieve because of the nature of the magnetic particles and the concentration of particles required to provide a sufficient signal to write and read magnetically stored data. There may also be noticeable color grain and haze associated with the magnetic layer depending upon the type of pigment and its laydown area concentration and the effective particle size thereof.

The critical photographic properties affected by the magnetic layer are the optical density and the granularity. To reduce the impact of the magnetic layer on photographic quality, both the optical density and the granularity must be minimized so these properties have no adverse effects on the color, the brightness of highlighted areas and the granularity of prints made from negatives or projected images from transparencies. This is what is meant when layers are spoken of herein as being "transparent in a photographic sense".

SUMMARY OF INVENTION

The invention provides a coating composition for applying a transparent magnetic recording layer to a support which comprises a polymeric binder, ferromagnetic particles and a dispersing medium for the polymeric binder, the dispersing medium comprising (a) a compound having the formula

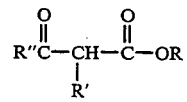

where
- R is alkyl having 1 to 8 carbon atoms, phenyl or benzyl;
- R' is hydrogen, methyl or ethyl; and
- R" is alkyl having 1 to 5 carbon atoms and
- (b) methylene chloride, lower alkyl ketones or mixtures of methylene chloride and lower alkyl ketones.

It is an advantageous feature of this invention that the above-described dispersions are particularly useful as precursors to compositions suitable for casting onto a support film to form a transparent magnetic recording layer with improved running durability for use on photographic elements. It is another advantageous feature of this invention that the above described dispersions can provide transparent magnetic recording layers which are free of unacceptable magnetic particle and-/or non-magnetic inorganic particle agglomerations that cause increased light scattering. It is another advantageous feature of this invention that the solvent systems in accordance with this invention are compatible with carbon bed solvent recovery systems. It is another advantageous feature of this invention that the photographic prints prepared from photographic elements containing such magnetic recording layers exhibit virtually no increase in graininess attributable to the magnetic recording layer. Yet another advantageous feature of this invention is that polyisocyanate crosslinking agents can be incorporated into the same layer as the nonmagnetic inorganic particles. Another advantageous feature is improved coating uniformity and lack of convective cell formation.

DESCRIPTION OF THE PREFERRED EMBODIMENTS

The coating composition in accordance with this invention may be prepared by any suitable technique including the simultaneous mixing of all of the necessary ingredients for the preparation of the transparent magnetic recording layer or by a sequential technique wherein the magnetic particles are milled in a suitable grind medium and subsequently diluted with dispersing media together with additional ingredients as described in U.S. Pat. No. 4,990,276 to provide either an intermediate or a final letdown. This intermediate can be modified depending upon the final requirements such as the addition of crosslinking agents and the like, which preferably are added shortly before coating the magnetic layer onto a suitable support. The sequential technique is the preferred method for preparing the coating composition.

In the sequential technique, the transparent magnetic layer is prepared by initially forming a high solids content magnetic grind concentrate, or first dispersion, by mixing the magnetic particles in a suitable grind solvent as disclosed in U.S. Pat. No. 4,990,276 together with suitable surfactants and milling in a device such as, for example, a ball mill, a roll mill, a high speed impeller mill, media mill, an attritor or a sand mill. Milling proceeds for a sufficient time to ensure that substantially no agglomerates of the magnetic particles remain. The high solids magnetic grind concentrate is next diluted with suitable solvents and polymeric stabilizers to maintain the particles in an unagglomerated state (subsequently referred to as the intermediate letdown). Mixing for an additional period of time is continued in order to polish the ingredients.

In a separate container, the binder polymer is dissolved in a suitable solvent. To this solution is added the intermediate letdown in accordance with the procedure set forth above and stirring is continued to prepare a second dispersion. A third dispersion of abrasive particles in a dispersing agent and a portion of the dispersing medium is prepared by milling to break up agglomerates of the abrasive particles and this is added to the mixer containing the binder solution and intermediate letdown to form a fourth dispersion. This dispersion may be coated onto a suitable support in its present form or additional and optional ingredients such as, crosslinking agents, catalysts, coating aids, lubricants and the like, may be added before the coating operation.

The dispersing medium in accordance with this invention may be added in the preparation of the first dispersion, i.e., the grind phase for the preparation of the magnetic particles or in the letdown of this phase so long as the dispersing medium of the coating composition comprises methylene chloride, a lower alkyl ketone and a compound having the above formula.

The coating composition is applied to a suitable support which may contain additional layers for promoting adhesion, by any suitable coating device including slot die hoppers, slide hoppers, gravure coaters, reverse roll coaters and the like.

The magnetic layer can also be overcoated with conventional layers including antistats, protective overcoats, lubricants and the like.

The compound represented by the formula set forth above is present in the dispersing medium in an amount of from about 0.5 percent by weight to about 10 percent by weight based on the total weight of the dispersing medium, preferably in an amount of from about 2 to about 8 weight percent and most preferably in an amount of from about 4 to about 6 percent by weight. The methylene chloride is present in the dispersing medium in an amount of from about 5 to about 95 percent and preferably in an amount of from about 15 to about 80 percent by weight based on the weight of the dispersing medium. The lower alkyl ketone is present in the dispersing medium in an amount of from about 2 to about 90 percent by weight and preferably in an amount of from about 15 to about 80 percent by weight based on the total weight of the dispersing medium.

Any suitable compound having the formula

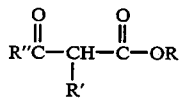

where

R is alkyl having 1 to 8 carbon atoms, phenyl or benzyl;

R' is hydrogen, methyl or ethyl; and

R" is alkyl having 1 to 5 carbon atoms, may be used.

In the above formula, R is alkyl having 1-8 carbon atoms such as, for example, methyl, ethyl, propyl, butyl, pentyl, hexyl, heptyl, octyl, isopropyl, isobutyl, tertiary butyl, isopentyl, neopentyl, 2,3 dimethyl butyl, 2,5 dimethylhexyl, and the like. R" is an alkyl having 1-5 carbon atoms. Those radicals having 1-5 carbon atoms mentioned above with respect to R are suitable for R". Suitable compounds in accordance with this invention and within the above stated formula include methyl acetoacetate, ethyl acetoacetate, n-propyl acetoacetate, n-butyl acetoacetate, n-pentyl acetoacetate, n-hexyl acetoacetate, n-heptyl acetoacetate, n-octyl acetoacetate, neopentyl acetoacetate, isopropyl acetoacetate, tert-butyl acetoacetate, 2,5 dimethylhexyl acetoacetate, methyl propionylacetate, ethyl propionylacetate, n-hexyl propionylacetate, isopropyl propionylacetate, 2,5 dimethylhexyl propionylacetate, methyl-2-methylacetoacetate, methyl-2-ethylacetoacetate, n-butyl-2-methylacetoacetate, isopropyl-2-ethylacetoacetate, n-octyl-2-methylacetoacetate and the like. Methyl acetoacetate is preferred.

Generally, any of the three compounds or portions thereof that make up the dispersion medium in accordance with this invention may be employed in each stage of the preparation of the coating composition for applying a transparent magnetic recording layer. It is preferred to employ methylene chloride for the intermediate letdown in an amount of about 85 to 99 percent by weight, more preferably 90 to 95 percent by weight of the total weight of the intermediate letdown. It is also preferred to employ a mixture of all three components of the dispersion medium in the second dispersion wherein the dispersion medium is present in an amount greater than 90 weight percent based on the total weight of the second dispersion.

In the preparation of the third dispersion, a compound in accordance with the formula set forth above is employed in an amount of about 55 percent by weight to about 90 percent by weight based on the total weight of the third dispersion.

Finally, the final coating composition, made up by combining the second and third dispersions in a weight ratio of about 4000:1 to about 1000:1 so as to contain about 85 to 98 percent by weight of the dispersing media and preferably from about 94 to 98 percent.

Any suitable support may be employed in the practice of this invention, such as, cellulose derivatives including cellulose diacetate, cellulose triacetate, cellulose propionate, cellulose butyrate, cellulose acetate propionate and the like; polyamides; polycarbonates; polyesters, particularly polyethylene terephthalate, poly-1,4-cyclohexanedimethylene terephthalate, polyethylene 1,2-diphenoxyethane-4,4'-dicarboxylate, polybutylene terephthalate and polyethylene naphthalate; polystyrene, polypropylene, polyethylene, polymethylpentene, polysulfone, polyethersulfone, polyarylates, polyether imides and the like. Particularly preferred supports are polyethylene terephthalate, polyethylene naphthalate and the cellulose esters particularly cellulose triacetate.

Thickness of those supports used in the present invention is from 50 μm to 180 μm preferably, 85 to 125 microns. In addition, various dyes may be formulated into the support or the magnetic layer to give neutral density.

Depending upon the nature of the support, suitable tie or undercoat layers may be desired. Particularly with regard to polyester supports, primers are used in order to promote adhesion. Any suitable primer in accordance with those described in the following U.S. Pat. Nos. may be employed: 2,627,088; 3,501,301;

4,689,359; 4,363,872; and 4,098,952. Each of these are incorporated herein by reference in their entirety.

The ferromagnetic pigments comprise ferromagnetic iron oxides, such as $\gamma$-$Fe_2O_3$, $Fe_3O_4$ or $\gamma$-$Fe_2O_3$ or $Fe_3O_4$ with Co, Zn or other metals in solid solution or surface treated, or ferromagnetic chromium dioxides, such as $CrO_2$ or $CrO_2$ with metallic elements, for example Li, Na, Sn, Pb, Fe, Co, Ni and Zn, or halogen atoms in solid solution. Ferromagnetic metal pigments with an oxide coating on their surface to improve their chemical stability or to improve dispersibility as is commonly used in conventional magnetic recording, may also be used in accordance with the invention. In addition, magnetic oxides with a thicker layer of lower refractive index oxide or other material having a lower optical scattering cross-section as taught in U.S. Pat. Nos. 5,217,804 and 5,252,444 may be used. Cobalt doped gamma iron oxide is the preferred ferromagnetic material for use in accordance with this invention.

Examples of the abrasive particles include nonmagnetic inorganic powders with a Mohs scale hardness of not less than 6, preferably not less than 8. The abrasive particles have an average diameter of from about 0.04 to about 0.4 $\mu$m and preferably an average diameter of from about 0.06 to 0.35 $\mu$m. Specific examples are metal oxides such as aluminum oxides, such as, alpha-alumina, corundum, chromium oxide ($Cr_2O_3$), iron oxide (alpha-$Fe_2O_3$), tin oxide, doped tin oxide, such as antimony or indium doped tin oxide, silicon dioxide and titanium dioxide; carbides such as silicon carbide and titanium carbide; and diamond in fine powder. Alpha alumina, the tin oxides or mixtures thereof, is the preferred abrasive in accordance with this invention. The tin oxide and doped tin oxides can be used in either their conductive or non-conductive form; however, when in the conductive form, an additional advantage is gained in that a dual purpose is served, that being the particles serve as abrasive particles in addition to conducting particles, the layer thereby acting as an antistat. Suitable conductive particles are disclosed in U.S. Pat. Nos. 4,495,276; 4,394,441; 4,431,764; 4,418,141 and 4,999,276 incorporated herein by reference.

The binders used in the magnetic layer include, for example, vinyl chloride-vinyl acetate copolymers, vinyl chloride-vinyl acetate-vinyl alcohol copolymers, vinyl chloride-vinyl acetate-maleic acid polymers, vinyl chloride-vinylidene chloride copolymers, vinyl chloride-acrylonitrile copolymers, acrylic ester-acrylonitrile copolymers, acrylic ester-vinylidene chloride copolymers, methacrylic ester-vinylidene chloride copolymers, methacrylic ester-styrene copolymers, thermoplastic polyurethane resins, phenoxy resins, polyvinyl fluoride, vinylidene, chloride-acrylonitrile copolymers, butadiene-acrylonitrile copolymers, acrylonitrile-butadiene-acrylic acid copolymers, acrylonitrile-butadiene-methacrylic acid copolymers, polyvinyl butyral, polyvinyl acetal, cellulose derivatives, styrene-butadiene copolymers, polyester resins, phenolic resins, epoxy resins, thermosetting polyurethane resins, urea resins, melamine resins, alkyl resins, urea-formaldehyde resins and the like. Of the above, the cellulose derivatives are the preferred binders for use in accordance with this invention. Cellulose derivatives include cellulose esters such as, for example, cellulose acetate, cellulose diacetate, cellulose triacetate, cellulose acetate butyrate, cellulose acetate propionate, and the like. The most preferred binder is cellulose diacetate. For crosslinking of the binder with isocyanates, the binder should contain active hydrogen atoms as determined by the Zerewitinoff test, such active hydrogen atoms including —OH, —$NH_2$ —NHR, where R is an organic radical, and the like, as described in U.S. Pat. No. 3,479,310.

A dispersing agent, sometimes referred to as a wetting agent, a surfactant or a surface active agent, can be present in the dispersion to facilitate dispersion of the magnetic particles and/or wetting of the particles with the dispersing medium. This helps to further minimize agglomeration of the magnetic particles. The dispersing agent can be present in the dispersion in an amount up to about 0.03%, preferably 0.001 to 0.02%, by weight based on the weight of the total dispersion. Useful dispersing agents include fatty acid amines, and commercially available wetting agents such as Witco Emcol CC59 which is a quaternary amine available from Witco Chemical Corp. Rhodafac PE 510, Rhodafac RE 610, Rhodafac RE 960, and Rhodafac LO 529 which are phosphoric acid esters available from Rhom Poulenc. Other constituents of the coating composition including grind solvents, coating aids, and solvents for the binder are included. Suitable grind solvents include, for example, an ester of an acid such as phthalic acid. Preferred esters are dialkylesters of phthalic acid, the alkyl portion of which can contain from 1 to about 12, preferably 4 to 8, carbon atoms. Exemplary useful esters include dimethyl phthalate, diethyl phthalate, dioctyl phthalate, dipropyl phthalate, and dibutyl phthalate as disclosed in U.S. Pat. No. 4,990,276 issued to Bishop et al. and assigned to the same assignee as this application.

Suitable coating aids include nonionic fluorinated alkyl esters such as, FC-430 and FC-431 sold by Minnesota Mining and Manufacturing Co., polysiloxanes such as DC 1248, DC 200, DC 510, DC 190 sold by Dow Corning and BYK 310, BYK 320 and BYK 322 sold by BYK Chemie and SF 1079, SF 1023, SF 1054, and SF 1080 sold by General Electric.

Optionally, the binder in the magnetic layer may be crosslinked employing any suitable crosslinking agent such as, for example, organic isocyanates, aziridines, melamines such as methoxymethylmelamine, and the like as set forth in U.S. Pat. No. 5,198,499 to Anderson et al. issued Mar. 30, 1993 and assigned to the same assignee as this application.

Any suitable organic polyisocyanate can be used as the crosslinking agent such as, tetramethylene diisocyanate, hexamethylene diisocyanate, diisocyanate dimethylcyclohexane, dicyclohexylmethane diisocyanate, isophorone diisocyanate, dimethylbenzene diisocyanate, methylcyclohexylene diisocyanate, lysine diisocyanate, tolylene diisocyanate, diphenylmethane diisocyanate, polymers of the foregoing, polyisocyanates prepared by reacting an excess of an organic diisocyanate with an active hydrogen containing compounds such as polyols, polyethers and polyesters and the like including ethylene glycol, propylene glycol, dipropylene glycol, butylene glycol, trimethylol propane, hexanetriol, glycerine, sorbitol, pentaerythritol, caster oil, ethylenediamine, hexamethylenediamine, ethanolamine, diethanolamine, triethanolamine, water, ammonia, urea and the like, including biuret compounds, allophanate compounds and the like. The preferred polyisocyanates employed as a crosslinking agent is the reaction product of trimethylol propane and 2,4-tolylene diisocyanate sold by Mobay under the trade designation Mondur CB 75.

As noted, photographic elements in accordance with this invention comprise at least one photosensitive layer. Such photosensitive layers can be image-forming layers containing photographic silver halides such as silver chloride, silver bromide, silver bromoiodide, silver chlorobromide and the like. Both negative and reversal silver halide elements are contemplated. For reversal films, the emulsion layers as taught in U.S. Pat. No. 5,236,817, especially Examples 16 and 21, are particularly suitable. Any of the known silver halide emulsion layers, such as those described in Research Disclosure, Vol. 176, December 1978 Item 17643 and Research Disclosure Vol. 225, January 1983 Item 22534, the disclosures of which are incorporated by reference in their entirety, are useful in preparing photographic elements in accordance with this invention. Generally, the photographic element is prepared by coating the support film on the side opposite the magnetic recording layer with one or more layers comprising a dispersion of silver halide crystals in an aqueous solution of gelatin and optionally one or more subbing layers, such as, for example, gelatin, etc. The coating process can be carried out on a continuously operating machine wherein a single layer or a plurality of layers are applied to the support. For multicolor elements, layers can be coated simultaneously on the composite support film as described in U.S. Pat. No. 2,761,791 and U.S. Pat. No. 3,508,947. Additional useful coating and drying procedures are described in Research Disclosure,. Vol. 176, December 1978, Item 17643. Suitable photosensitive image forming layers are those which provide color or black and white images.

As is taught in U.S. Pat. No. 3,782,947 noted above, whether an element is useful for both photographic and magnetic recording depends on both the size distribution and concentration of the magnetic particles and on the relationship between the granularities of the magnetic and photographic coatings. Generally, of course, the coarser the grain of the emulsion in the photographic element that contains the magnetic recording layer, the larger the mean size of the magnetic particles which can be tolerated. A magnetic particle concentration between about 10 and 1000 mg/m$^2$ when uniformly distributed across the desired area of the photographic element will be sufficiently photographically transparent provided that the maximum particle size is less than about 1 micron. Particle concentrations less than about 10 mg/m$^2$ tend to be insufficient for magnetic recording purposes and particle concentrations greater than about 1000 mg/m$^2$ tend to be too optically dense for photographic purposes. Particularly useful particle concentrations are in the range of 20–70 mg/m$^2$. Concentrations of about 20 mg/m$^2$ have been found to be particularly useful in reversal films and concentrations of about 40 mg/m$^2$ are particularly useful in negative films.

The photographic elements according to this invention can contain one or more conducting layers such as antistatic layers and/or anti-halation layers such as such as described in Research Disclosure, Vol. 176, December 1978, Item 17643 to prevent undesirable static discharges during manufacture, exposure and processing of the photographic element. Antistatic layers conventionally used in color films have been found to be satisfactory for use herewith. Any of the antistatic agents set forth in U.S. Pat. No. 5,147,768, which is incorporated herein by reference may be employed. Preferred antistats include metal oxides, for example, tin oxide, antimony doped tin oxide and vanadium pentoxide, silver doped vanadium pentoxide and mixtures thereof.

The photographic elements according to this invention can be provided with a lubricant, such as a wax in, on or over the transparent magnetic recording layer. Suitable lubricants include silicone oil, silicones having polar groups, fatty acid-modified silicones, fluorine-containing silicones, fluorine-containing alcohols, fluorine-containing esters, polyolefins, polyglycols alkyl phosphates and alkali metal salts thereof, alkyl sulfates and alkali metal salts thereof, polyphenyl ethers, fluorine-containing alkyl sulfates and alkali metal salts thereof, monobasic fatty acids having 10 to 24 carbon atoms (which may contain unsaturated bonds or may be branched) and metal salts thereof (such as Li, Na, K and Cu), monovalent, divalent, trivalent, tetravalent, pentavalent and hexavalent alcohols having 12 to 22 carbon atoms (which may contain unsaturated bonds or may be branched), alkoxy alcohols having 12 to 22 carbon atoms, mono-, di- and tri-esters of monobasic fatty acids having 10 to 24 carbon atoms (which may contain unsaturated bonds or may be branched) and one of monovalent, divalent, trivalent, tetravalent, pentavalent and hexavalent alcohols having 2 to 12 carbon atoms (which may contain unsaturated bonds or may be branched), fatty acid esters of monoalkyl ethers of alkylene oxide polymers, fatty acid amides having 8 to 22 carbon atoms and aliphatic amines having 8 to 22 carbon atoms.

Specific examples of these compounds (i.e., alcohols, acids or esters) include lauric acid, myristic acid, palmitic acid, stearic acid, behenic acid, butyl stearate, oleic acid, linoleic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, pentaerythrityl tetrastearate, oleyl alcohol and lauryl alcohol. Carnauba wax is preferred.

The invention will be further illustrated by the following examples in which parts and percentages are given by weight unless otherwise specified.

EXAMPLE 1

A coating composition containing the ingredients of Table 1 is cast onto a subbed polyethylene terephthalate support.

The coating composition is prepared by forming a first dispersion or grind concentrate of magnetic particles, surfactant and grind solvent, which are milled to break up the magnetic particle agglomerates. This concentrate is added to the binder/dispersion stabilizer dissolved in a portion of the methylene chloride solvent to form an intermediate letdown.

The intermediate letdown is added to a binder solution in a portion of the methylene, chloride, acetone, methyl acetoacetate solvents to form a second dispersion.

A third dispersion is prepared by milling abrasive particles in methylene chloride and a surfactant to break up agglomerates of the abrasive particles. After milling, the abrasive particle dispersion was let down in a methylene chloride solution of cellulose triacetate.

The third dispersion is added to the second dispersion using a high shear mixer and crosslinking agent and catalyst are added. Finally the coating aid is added with low shear and cast as above to form the magnetic layer. An overcoat of carnauba wax at a coverage of 2.5 mg/ft$^2$ is applied. The coated layers are dried and then heated to 55° to 66° C. for 85 hours.

TABLE 1

| Dispersion Ingredient | | Percent |
|---|---|---|
| Cellulose Diacetate | Binder | 2.4 |
| Cellulose Triacetate | Binder/Dispersion Stabilizer | 0.125 |
| Toda CSF-4085V2 | Magnetic Pigment (Co-$\gamma$-$Fe_2O_3$) | 0.125 |
| Rhodafac PE510 | Surfactant | 0.006 |
| Dibutyl Phthalate | Grind Solvent | 0.247 |
| Mondur CB-75 | Crosslinking Agent | 0.24 |
| Stannous octoate | Catalyst | 0.12 |
| 3M FC-431 | Coating Aid | 0.015 |
| Sumitomo AKP-50 | Abrasive Particle ($\alpha$-$Al_2O_3$) | 0.45 |
| Methylene chloride | Solvent Dispersing Medium | 67.39 |
| Acetone | Solvent Dispersing Medium | 24.068 |
| Methyl acetoacetate | Solvent Dispersing Medium | 4.814 |

EXAMPLE 2

The procedure of Example 1 is repeated with the exception that no third dispersion containing abrasive particles is employed. The ingredients and quantities are set forth in Table 2.

TABLE 2

| Dispersion Ingredient | Percent |
|---|---|
| Cellulose Diacetate | 2.7 |
| Cellulose Triacetate | 0.13 |
| Toda CSF-4085V2 | 0.13 |
| Rhodafac PE510 | 0.0065 |
| Dibutyl Phthalate | 0.253 |
| Mondur CB-75 | 0.27 |
| 3M FC-431 | 0.015 |
| Methylene chloride | 67.5465 |
| Acetone | 24.124 |
| Methyl acetoacetate | 4.825 |

EXAMPLE 3

A magnetic layer is prepared as described for Example 2 except omitting the polyisocyanate and catalyst.

TABLE 3

| Dispersion Ingredient | Percent |
|---|---|
| Cellulose Diacetate | 3.0 |
| Cellulose Triacetate | 0.13 |
| Toda CSF-4085V2 | 0.13 |
| Rhodafac PE510 | 0.0065 |
| Dibutyl Phthalate | 0.253 |
| 3M FC-431 | 0.015 |
| Methylene chloride | 67.5255 |
| Acetone | 24.116 |
| Methyl acetoacetate | 4.823 |

EXAMPLE C-1 (Comparison)

A magnetic layer is prepared as described in Example 1 except omitting the polyisocyanate and coating aid, using a mixture of methylene chloride and methanol for Dispersion 2, and using methylene chloride, methanol, and cyclohexanone for the dispersing medium. The dispersion formulation is given in Table 5. Subsequently, the cast magnetic layer is overcoated with 2.5 mg/sq ft of pentaerythrityl tetrastearate.

TABLE C-1

| Dispersion Ingredient | Percent |
|---|---|
| Cellulose Diacetate | 2.0 |
| Toda CSF-4085V2 | 0.1 |
| Rhodafac PE510 | 0.005 |
| Dibutyl Phthalate | 0.195 |
| Methylene chloride | 74.16 |
| Cyclohexanone | 5.0 |

TABLE C-1-continued

| Dispersion Ingredient | Percent |
|---|---|
| Methanol | 18.54 |

EXAMPLE 4

The procedure of Example 1 is repeated except that the polyisocyanate and catalyst are omitted. The ingredients and quantities are set forth in Table 4.

TABLE 4

| Dispersion Ingredient | Function | Percent |
|---|---|---|
| Cellulose Diacetate | Binder | 2.550 |
| Cellulose Triacetate | Binder/Dispersion Stabilizer | 0.117 |
| Toda CSF-4085V2 | Magnetic Particle | 0.117 |
| Rhodafac PE510 | Surfactant | 0.006 |
| Dibutyl Phthalate | Grind Solvent | 0.137 |
| Norton E-600 | Abrasive Particle ($\alpha$-$Al_2O_3$) | 0.577 |
| 3M FC-431 | Coating Aid | 0.298 |
| Zeneca Solsperse 24000 | Dispersing Agent | 0.115 |
| Methylene chloride | Solvent | 67.258 |
| Acetone | Solvent | 24.021 |
| Methyl acetoacetate | Solvent | 4.804 |

Abrasion/Scratch Resistance

The resistance to abrasion and scratches of lubricated cast layers is evaluated with a Taber Abraser. This test consists of a turntable on which a transparent sample is mounted. Two CS10F wheels at a load of 124 grams are in contact with the rotating sample. The wheels turn in opposite directions creating an abrasion track. The abrasion severity is determined optically by measuring the difference in haze (reported as % delta haze) produced by the abraded and unabraded sample using an XL-211 Hazegard System which measures transmitted light on a percentage basis for any light deviating by more than 25° from the incident beam. The Taber Abraser is typically insensitive to surface lubrication.

Rotating Drum Friction Test

The running durability of the lubricated cast layers is evaluated using a Steinberg Rotating Drum Friction Tester. The initial (breakaway) friction coefficient and final (running) friction coefficient are measured under 50 gram load and drum speed of 30 cm/sec at 23° C. and 50% relative humidity. The running friction is measured after 10 minutes. The Rotating Drum Friction Test is sensitive to surface lubrication.

TABLE 5

| Number | Taber % Delta Haze | Rotating Drum Friction Initial | Running |
|---|---|---|---|
| Example 1 | 1.8 | 0.16 | 0.04 |
| Example 2 | 4.6 | 0.15 | 0.08 |
| Example 3 | 5.2 | 0.16 | 0.09 |
| Example C-1 | 18.3 | >0.76 | >0.76 |
| Example 4 | 4.1 | 0.25 | 0.11 |

As is apparent from the results in Table 5, the samples of Examples 1–4 offer excellent resistance to abrasion and scratching as well as excellent running durability.

By contrast, the sample of Example C-1 displays poor abrasion and scratch resistance and poor running durability.

In addition to the magnetic pigments, various dyes including magenta and blue may also be formulated into the pigmented layer to give neutral density films for purpose of making reversal (color slide) films.

EXAMPLES 5-10

A color photographic recording material for color negative development is prepared by applying the following layers in the given sequence to the opposite side of each of the supports of Examples 1-4 and Example C-1. The quantities of silver halide are given in grams of silver per m². The quantities of other materials are given in g per m².

Layer 1 {Antihalation Layer} black colloidal silver sol containing 0.236 g of silver, with 2.44 gelatin.

Layer 2 {First (least) Red-Sensitive Layer} Red sensitized silver iodobromide emulsion [1.3 mol % iodide, average grain diameter 0.55 microns, average thickness 0.08 microns] at 0.49 g, red sensitized silver iodobromide emulsion [4 mol % iodide, average grain diameter 1.0 microns, average thickness 0.09 microns] at 0.48 g, cyan dye-forming image coupler C-1 at 0.56 g, cyan dye-forming masking coupler CM-1 at 0.033 g, BAR compound B-1 at 0.039 g, with gelatin at 1.83 g.

Layer 3 {Second (more) Red-Sensitive Layer} Red sensitive silver iodobromide emulsion [4 mol % iodide, average grain diameter 1.3 microns, average grain thickness 0.12 microns] at 0.72 g, cyan dye-forming image coupler C-1 at 0.23 g, cyan dye-forming masking coupler CM-1 at 0.022 g, DIR compound D-1 at 0.011 g, with gelatin at 1.66 g.

Layer 4 {Third (most) Red-Sensitive Layer} Red sensitized silver iodobromide emulsion [4 mol % iodide, average grain diameter 2.6 microns, average grain thickness 0.13 microns] at 1.11 g, cyan dye-forming image coupler C-1 at 0.13 g, cyan dye-forming masking coupler CM-1 at 0.033 g, DIR compound D-1 at 0.024 g, DIR compound D-2 at 0.050 g, with gelatin at 1.36 g.

Layer 5 {Interlayer} Yellow dye material YD-1 at 0.11 g and 1.33 g of gelatin.

Layer 6 {First (least) Green-Sensitive Layer} Green sensitized silver iodobromide emulsion [1.3 mol % iodide, average grain diameter 0.55 microns, average grain thickness 0.08 microns] at 0.62 g, green sensitized silver iodobromide emulsion [4 mol % iodide, average grain diameter 1.0 microns, average grain thickness 0.09 microns] at 0.32 g, magenta dye-forming image coupler M-1 at 0.24 g, magenta dye-forming masking coupler FIM-1 at 0.067 g with gelatin at 1.78 g.

Layer 7 {Second (more) Green-Sensitive Layer} Green sensitized silver iodobromide emulsion [4 mol % iodide, average grain diameter 1.25 microns, average grain thickness 0.12 microns] at 1.00 g, magenta dye-forming image coupler M-1 at 0.091 g, magenta dye-forming masking coupler MM-1 at 0.067 g, DIR compound D-1 at 0.024 g with gelatin at 1.48 g.

Layer 8 {Third (most) Green-Sensitive Layer} Green sensitized silver iodobromide emulsion [4 mol % iodide, average grain diameter 2.16 microns, average grain thickness 0.12 microns] at 1.00 g, magenta dye-forming image coupler M-1 at 0.0.72 g, magenta dye-forming masking coupler MM-1 at 0.056 g, DIR compound D-3 at 0.01 g, DIR compound D-4 at 0.011 g, with gelatin at 1.33 g.

Layer 9 {Interlayer} Yellow dye material YD-2 at 0.11 g with 1.33 g gelatin.

Layer 10 {First (less) Blue-Sensitive Layer} Blue sensitized silver iodobromide emulsion [1.3 mol % iodide, average grain diameter 0.55, average grain thickness 0.08 microns] at 0.24 g, blue sensitized silver iodobromide emulsion [6 mol % iodide, average grain diameter 1.0 microns, average grain thickness 0.26 microns] at 0.61 g, yellow dye-forming image coupler Y-1 at 0.29 g, yellow dye forming image coupler Y-2 at 0.72 g, cyan dye-forming image coupler C-1 at 0.017 g, DIR compound D-5 at 0.067 g, BAR compound B-1 at 0.003 g with gelatin at 2.6 g.

Layer 11 {Second (more) Blue-Sensitive Layer} Blue sensitized silver iodobromide emulsion [4 mol % iodide, average grain diameter 3.0 microns, average grain thickness 0.14 microns] at 0.23 g, blue sensitized silver iodobromide emulsion [9 mol % iodide, average grain diameter 1.0 microns] at 0.59 g, yellow dye-forming image coupler Y-1 at 0.090 g, yellow dye-forming image coupler Y-2 at 0.23 g, cyan dye-forming image coupler C-1 0.022 g, DIR compound D-5 at 0.05 g, BAR compound B-1 at 0.006 g with gelatin at 1.97 g.

Layer 12 {Protective Layer} 0.111 g of dye UV-1, 0.111 g of dye UV-2, unsensitized silver bromide Lippman emulsion at 0.222 g, 2.03 g.

This film is hardened at coating with 2% by weight to total gelatin of hardener H-1. Surfactants, coating aids, scavengers, soluble absorber dyes and stabilizers are added to the various layers of this sample as is commonly practiced in the art.

The formulas for the component materials are as follows:

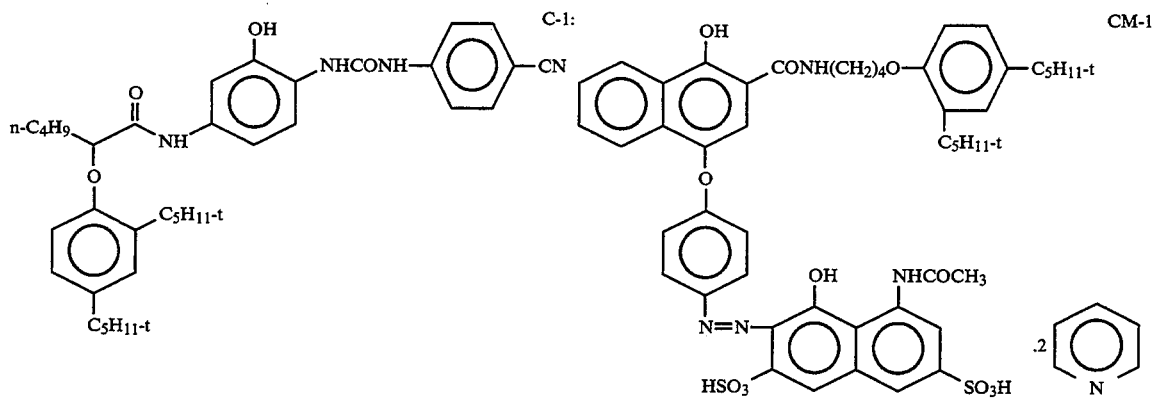

-continued
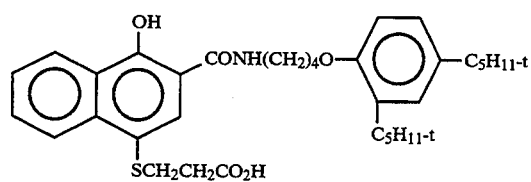
B-1
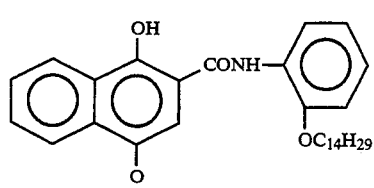
D-1:
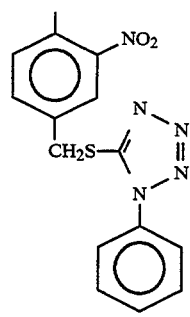
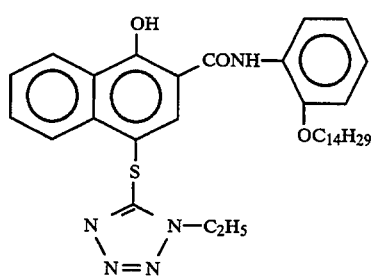
D-2
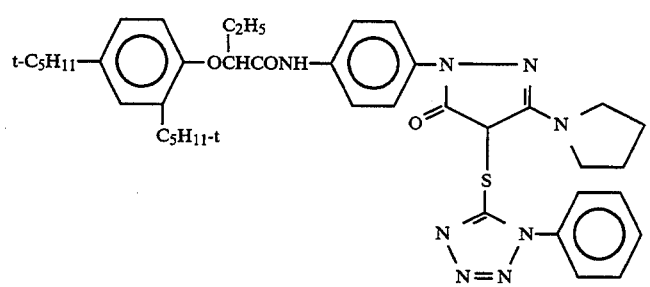
D-3:
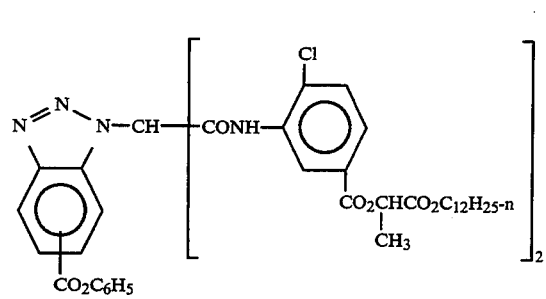
D-4
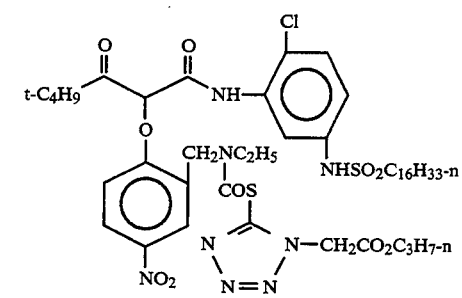
D-5:

-continued

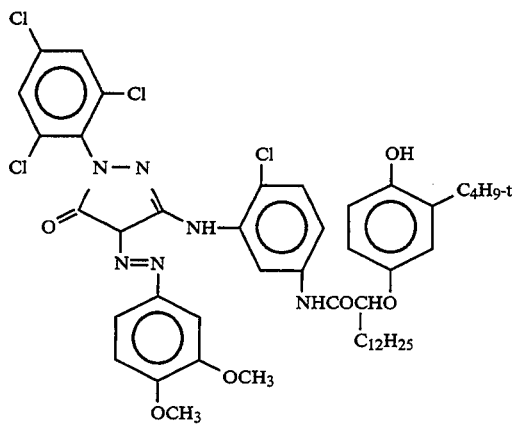
MM-1

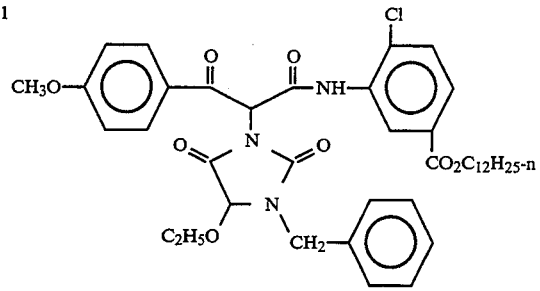
Y-1:

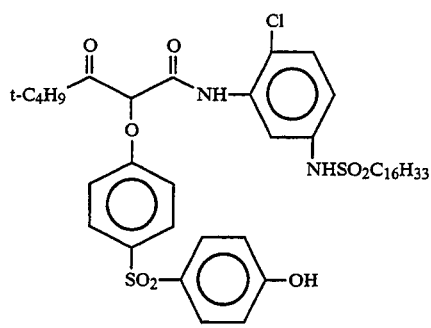
Y-2:

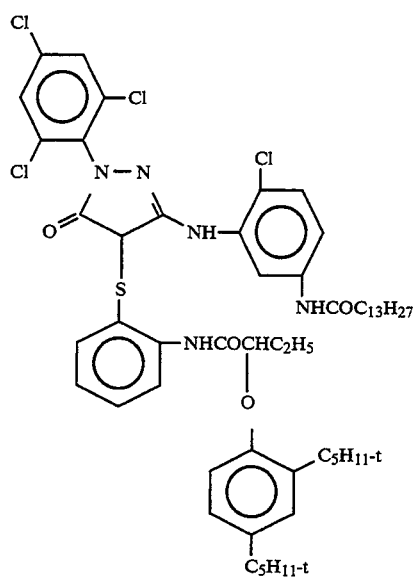
M-1:

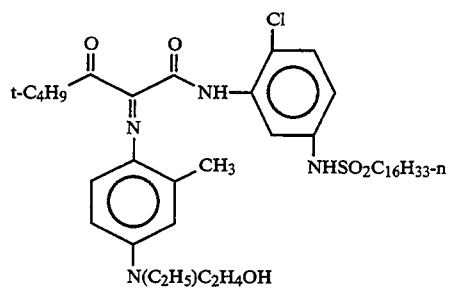
YD-1:

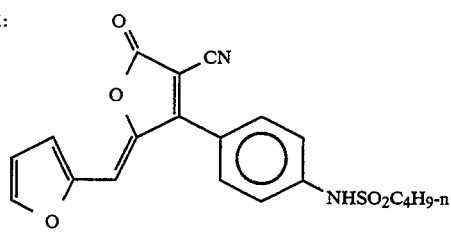
YD-2:

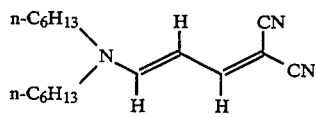
UV-1:

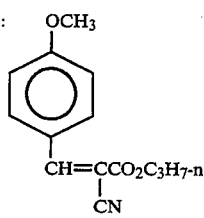
UV-2:

CH₂(SO₂CH=CH₂)₂  H-1:

These examples when tested in the same manner as Examples 1–4 with respect to abrasion, scratch and running durability give comparable results.

The invention has been described in detail with particular reference to preferred embodiments thereof, but it will be understood that variations and modifications can be effected within the spirit and scope of the invention.

What is claimed is:

1. A coating composition for applying a transparent magnetic recording layer to a support which comprises a polymeric binder, ferromagnetic particles and a dispersing medium for the polymeric binder, the dispersing medium comprising (a) a compound having the formula

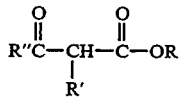

where
- R is alkyl having 1 to 8 carbon atoms, phenyl or benzyl;
- R' is hydrogen, methyl or ethyl; and
- R" is alkyl having 1 to 5 carbon atoms, and
- (b) methylene chloride, or lower alkyl ketones or mixtures of methylene chloride and lower alkyl ketones.

2. The coating composition of claim 1. wherein the lower alkyl ketone is acetone.

3. The coating composition of claim 1 wherein the compound having the formula is present in an amount of from about 0.5 percent by weight to about 10 percent by weight based on the total weight of the dispersing medium.

4. The coating composition of claim 3 wherein the compound having the formula is present in an amount of from about 2 to about 8 weight percent based on the total weight of the dispersing medium.

5. The coating composition of claim 3 wherein the compound having the formula is present in an amount of from about 4 to about 6 percent by weight based on the total weight of the dispersing medium.

6. The coating composition of claim 1 wherein methylene chloride is present in an amount of from about 5 to about 95 percent by weight, the lower alkyl ketone is present in an amount of from about 2 to about 90 percent by weight and the compound having the formula is present in an amount of from about 0.5 to about 10 percent by weight based on the total weight of the dispersing medium.

7. The coating composition of claim 6 wherein the methylene chloride is present in an amount of from about 15 to 80 percent by weight, the lower alkyl ketone is present in an amount of from about 15 to 80 percent by weight and the compound having the formula is present in an amount of from about 2 to 8 percent by weight.

8. The coating composition of claim 1 wherein abrasive particles having an average diameter of from about 0.04 to about 0.4 $\mu$m and a Mohs hardness of at least 6 are present in the coating composition.

9. The coating composition of claim 1 wherein an effective amount of a surfactant to prevent agglomeration of the magnetic particles is included in the coating composition.

10. The coating composition of claim 1 wherein the compound having the formula is methyl acetoacetate.

11. The coating composition of claim 1 wherein the polymeric binder is a cellulose ester, a polyurethane or a vinyl polymer.

12. The coating composition of claim 11 wherein the polymeric binder is a cellulose ester.

13. The coating composition of claim 12 wherein the cellulose ester is cellulose diacetate.

14. The coating composition of claim 11 wherein the polymeric binder is a polyurethane.

15. The coating composition of claim 11 wherein the polymeric binder is a vinyl polymer.

16. The coating composition of claim 1 including a crosslinking agent.

17. The coating composition of claim 16 wherein the crosslinking agent is an aziridine, a melamine or an isocyanate.

18. The coating composition of claim 17 wherein the crosslinking agent is an isocyanate.

* * * * *